United States Patent [19]
Drown

[11] 3,757,295
[45] Sept. 4, 1973

[54] TEST CIRCUIT FOR VEHICLE TIRE AIR PRESSURE MONITORING SYSTEM

[75] Inventor: George C. Drown, Fort Dodge, Iowa

[73] Assignee: Leward M. Larson, Ft. Dodge, Iowa ; a part interest

[22] Filed: Apr. 17, 1972

[21] Appl. No.: 244,599

Related U.S. Application Data

[63] Continuation-in-part of Ser. No. 66,690, Aug. 25, 1970, Pat. No. 3,675,198.

[52] U.S. Cl. ................................ 340/58, 200/61.25
[51] Int. Cl. ............................................. B60c 23/02
[58] Field of Search ...................... 340/58, 59, 52 F; 200/61.25

[56] References Cited
UNITED STATES PATENTS

| | | | |
|---|---|---|---|
| 2,511,631 | 6/1950 | Gordon | 340/52 F |
| 3,370,459 | 2/1968 | Cescati | 340/58 X |
| 3,312,936 | 4/1967 | Huntzinger | 340/59 |

*Primary Examiner*—Alvin H. Waring
*Attorney*—Zarley, McKee & Thomte

[57] ABSTRACT

A circuit is established which includes an air pressure sensing unit on the vehicle wheel and the air pressure signalling indicator in the vehicle. The test circuit also includes a resistor in parallel with the most remote component in the air pressure monitoring system, the air pressure sensing unit, whereby a small amount of current will flow sufficient to operate an amp meter but insufficient to register on the air pressure signalling indicator. A switching arrangement is provided for selectively and individually switching in and out each of the tire circuits for all wheels of the vehicle and also switching out the amp meter.

8 Claims, 8 Drawing Figures

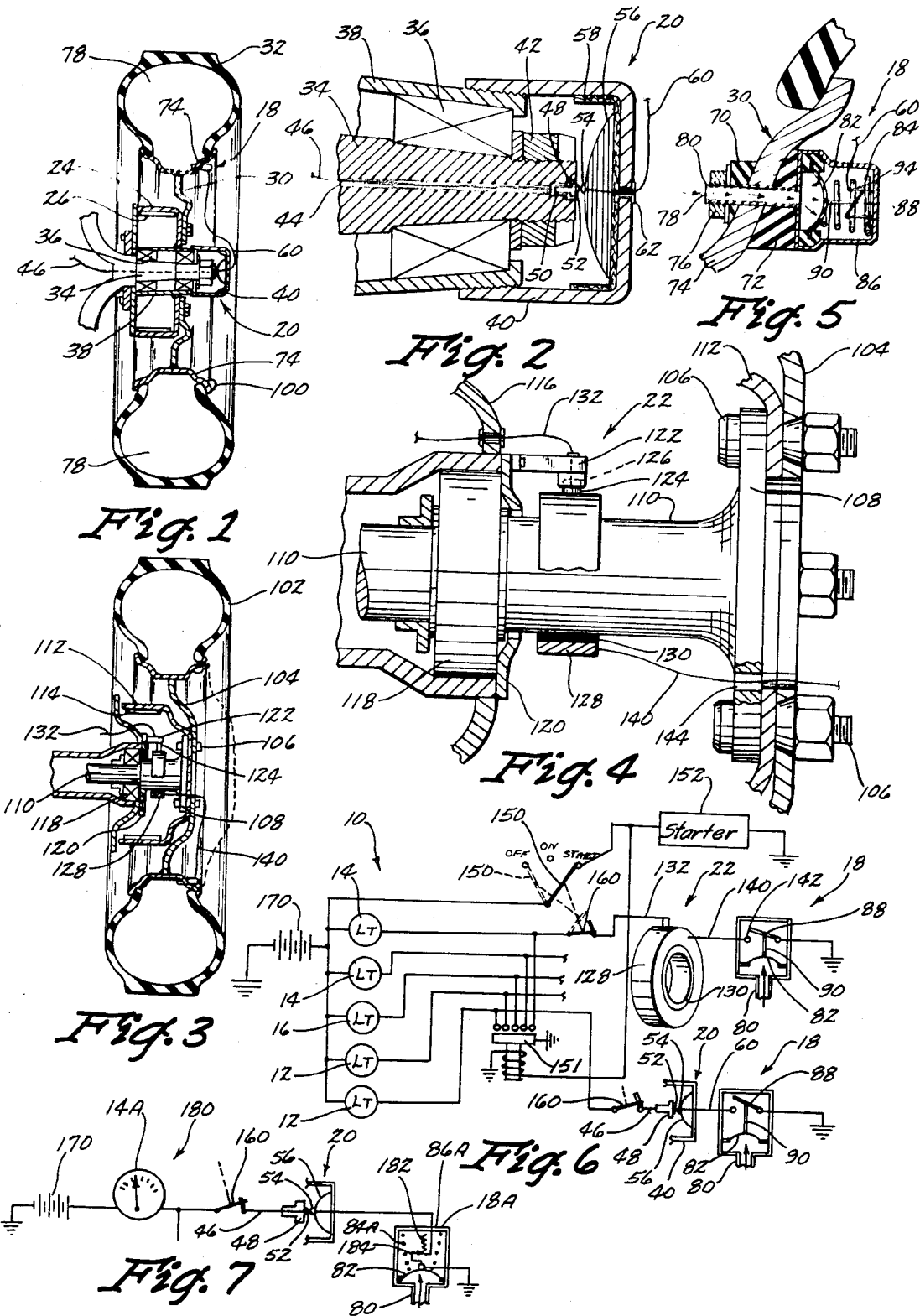

TEST CIRCUIT FOR VEHICLE TIRE AIR PRESSURE MONITORING SYSTEM

This application is a continuation-in-part of my co-pending application Ser. No. 66,690 filed Aug. 25, 1970, Vehicle Tire Air Pressure Monitoring System which issued as U.S. Pat. No. 3,675,198.

The cause of many highway accidents can be traced to improperly inflated tires. The manual checking of the tire inflation pressure is time consuming and too infrequently performed. The loss of tire pressure while the vehicle is moving will usually go undetected until after it is too late. The tire pressure monitoring system of this invention will provide either continuous monitoring of the tire pressure for each tire as accurately as desired or will actuate signalling lights when a dangerously low predetermined air pressure has been reached by any of the tires.

One of the difficult problems in monitoring the pressure of vehicle tires is in establishing a reliable electrical circuit through the rotating wheels. The monitoring circuit of this invention involves without foolproof electrical circuit for both sensing and rear wheels which will not only be reliable for transmitting air pressure information it will also indicate for both the front and rear wheels function upon presence of defective wheel bearings by grounding the circuit at the front and rear axles and thereby turning on the associated warning light. small The signalling units on the wheels are so positioned parallel to the axis of rotation for the wheels that the centrifugal forces developed as the wheels rotate do not affect the signalling unit sensitivity.

Heretofore there has been no way to readily ascertain if the circuit between the passenger compartment of the vehicle and the air pressure sensing unit on the wheels was operative wihtout actually activating the air pressure s ensing unit thereby causing the signalling indicator in the vehicle to be operated. An open circuit at some point could cause the signalling indicator to not functionupon the air pressure sensing unit being operated by an underinflated tire. The test circuit of this invention enables the operator of the vehicle to quickly and simply test this pressure monitoring system circuit for continuity. The test will indicate that the pressure monitoring system circuit is operative through the air pressure signalling indicator, the hubs of the wheels to the air pressure sensing unit on each of the wheels. This is accomplished by adding a resistor in parallel with the air pressure sensing unit on each of the wheels such that a samll amount of current flows in the air pressure monitoring system circuit sufficient to activate an amp meter unit but insufficient to activate the air pressure signalling indicator. The size of the resistance is selected in accordance with this criteria. A switch is also provided for selectively isolating each of the wheel circuits so that they may be tested one at a time and after the testing operation has been completed the amp meter is switched out of the circuit and the wheel circuits are ready to perform their air pressure monitoring function as the vehicle is operated.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a cross sectional view of a front wheel illustrating the associated air pressure signalling unit and electrical circuitry;

FIG. 2 is an enlarged fragmentary cross sectional view of the front wheel axle and enclosure rotatable with the wheel;

FIG. 3 is a cross sectional view similar to FIG. 1 but showing the rear wheel construction;

FIG. 4 is an enlarged fragmentary view of the rear wheel construction;

FIG. 5 is an enlarged cross sectional fragmentary view of the pressure signalling unit mounted horizontally in a wheel;

FIG. 6 is an electrical schematic drawing of the electrical monitoring system circuitry;

FIG. 7 is an alternate embodiment of the electrical circuitry showing a pressure signalling gauge.

Figure 8:
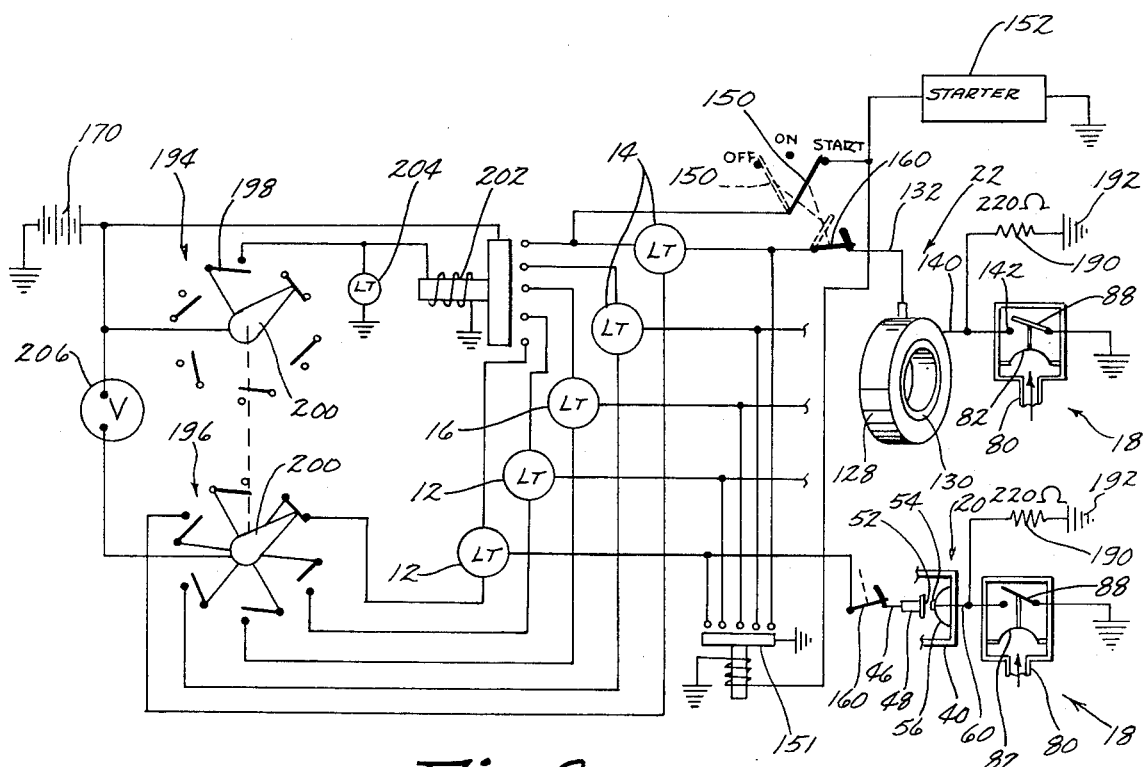
FIG. 8 is an electrical schematic of the test circuit for the vehicle tire air pressure monitoring system.

The vehicle tire pressure monitoring system of this invention is referred to generally in FIG. 6 by reference numeral 10 and includes signal lights 12, 14 and 16 for the front, rear and spare tires respectively. An air pressure signalling unit 18 is provided on each of the wheels and makes an electrical circuit through front and rear wheel brush units 20 and 22, respectively.

The front wheel structure is best seen in FIGS. 1 and 2 and includes a brake drum 24 having a brake shoe 26. A brake drum 24 is secured by bolts 28 to the front wheel 30 on which a tire 32 is mounted. The wheel spindle 34 is provided with bearings 36 in a wheel hub 38 secured to the brake drum 24. A dust or grease cap or enclosure cover 40 is threadably secured to the hub to enclose the outer end of the spindle 34 and the wheel bearings held in place by an adjusting nut 42.

A bore or passageway 44 extends through the spindle and an insulated conductor wire 46 extends therethrough and terminates in a button 48 seated in an insulator 50 on the axial center of the spindle 34. A bead 52 is provided directly on the axial center of the button 48 and is adapted to engage a bead 54 at the apex of a conically shaped coil spring 56 seated in the grease or dust cover 40 and insulated by an insulator 58. An insulated conductor wire 60 extends through a grommet 62 in the enclosure cover 40 and is connected to the spring 56 thereby making electrical contact between the rotating wire 60 on the wheel 30 and the stationary wire 46 in the spindle 34. When the front wheel is properly assembled with nondefective wheel bearings 36 the spring 56 will maintain yieldable frictional contact between the bead 54 thereon and the bead 52 on the button 48 in the outer end of the spindle 34. Upon looseness developing in the front wheel due to bearing wear the bead 54 on the spring 56 will slip over out of axial alignment with the bead 52 and contact the spindle 34 thereby grounding the circuit through the corresponding signal light 12.

The signalling unit 18 mounted in the wheel 30 is shimmed by the beveled oppositely disposed mounting shims 70 and 72 on the annularly disposed wheel flange 74 such that the signalling unit 18 is horizontally oriented to eliminate any affect thereon due to centrifugal forces developed during the rotation of the wheel. An adjustment nut 76 on the inside of the air chamber 78 holds the signalling unit 18 in place. A passageway 78 is provided through a sleeve 80 in communication with a diaphragm 82 against which a spring 84 bears. The spring 84 is held in place by a cover 86. A switch element 88 is yieldably held in an open position as seen in FIG. 5 by the air pressure on the diaphragm 82 which also bears against a pin 90 connected to the switch element 88. Upon the 2 pressure against the diaphragm 82 being reduced the pin 90 and switch element 88 will move to the left as seen in FIG. 5 and the switch element 88 will bear against the terminal 94 connected to the insulated wire 60 thereby completing the circuit through the associated signal light 12.

The air pressure signalling unit 18 will imbalance the front wheel 32 and thus a counterbalance weight 100 is provided diametrically opposite on the wheel flange 74.

A rear tire 102 is shown in FIG. 3 mounted on a wheel 104 secured by bolts 106 to the flange 108 of the rear drive axle shaft 110. A brake drum 112 is also secured on the shaft flange 108 and includes a brake shoe 114 enclosed in the brake drum adjacent to a back plate 116. The axle shaft 110 is mounted in wheel bearings 118 held in place by an outer bearing retainer 120.

An arm 122 is secured to the outer retainer 120 in turn stationary and secured to the back plate 116 on the axle shaft housing 122. A carbon brush 124 is biased by a spring 126 toward a conductor ring element 128 mounted on the axle shaft 110 and insulated by a ring element 130. An insulated wire 132 extends through a grommet 134 in the back plate 116 and is operatively connected to the associated signal light 14. Similarly, an insulated wire 140 extends from the conductor ring 128 and through an opening 144 in the shaft flange 108 and thence through the break shoe 112 and the wheel 104 to where it is connected to a terminal 142 in the air pressure signalling unit 18 hereinbefore described with reference to the front wheel 30. Defective rear wheel bearings will cause the arm 122 to be grounded out against the ring 118 and thereby activate the associated signal light.

The vehicle air pressure monitoring system circuitry as illustrated in FIG. 6 also includes a testing circuitry to check the signal lights 12, 14 and 16 such that when the ignition switch 150 is moved to the start position a circuit through the starter 152 and the lights 12, 14 and 16 is closed by the relay 151. Accordingly, at this time if the lights are operative they should light. Upon return of the ignition key to the on position the lights should go out and only again be relit upon one of the tires being deflated to a predetermined pressure which would cause the pressure signalling units 18 to close the electrical circuit. In the case of either a front or rear wheel bearing becoming defective the circuit will be grounded and closed thereby lighting the signal lights. Each of the lights 12, 14 and 16 include a switch 160 operated with the ignition switch 150 such that when the ignition switch 150 is in the dash line off position the signal lights will be inoperative and thereby avoid running the vehicle battery 170 down.

An alternative circuit 180 is shown in FIG. 7 which will enable precise readings in pounds to be registered on a signalling indicator 14A connected through the switch 160 and the switches 20 or 22 for the front and rear wheels respectively to the air pressure signalling unit 18A. The air pressure signalling unit 18A includes a sleeve 80 exposed to the air pressure of the tire and pressing against a diaphragm 82 against which a spring 84A bears. The spring 84A is held in place by an enclosure cover 86A. A resistance element 182 is engaged by a movable terminal 184 carried on the diaphragm 82 such that the voltage drop across the pressure signalling unit 18A will vary with the amount of resistance put into the circuit as a result of the air pressure in the tire. The greater the air pressure in the tire the less the resistance in the circuit will be and accordingly the gauge 14A will register a higher pressure. Conversely, as the pressure in the tire is reduced a greater amount of resistance will be introduced into the circuit thereby reducing the strength of the signal to the pressure gauge 14A.

It is thus seen that a continuous simple and foolproof monitoring system has been provided for monitoring the air pressure of front, rear and spare tires on any vehicle. Additionally, wheel bearing problems in the wheels will be detected. The speed of the wheel rotation will not affect the sensitivity of the monitoring system. The signalling indicators may be either on or off lights or pressure gauges to give precise readings of the air pressure in the tires. The signal indicators may be tested each time the vehicle ignition key is moved to the start position to verify that the lights or gauges are operative. The air pressure monitoring system may be used on existing cars with few changes in the existing structure being required or may be incorporated into vehicles at the plant. The electrical connections in both the front and rear wheels are enclosed and protected from dust and moisture and should be nearly maintenance free. The system of this invention is equally adapted for use on vehicles having either brake shoes or disc brakes.

The electrical schematic in FIG. 8 illustrates how the circuits of FIGS. 6 and 7 may be modified to incorporate the test circuit for the vehicle tire air pressure monitoring system.

A 220 ohm resistor 190 is connected in parallel with the air pressure sensing unit 18. The opposite side of the resistor is connected to ground at 192. A pair of six-pole ganged switches 194 and 196 are provided in the circuitry. The switch 194 functions as an on-off switch utilizing element 198 shown in its open position but adapted to be moved to a closed position by the rotor 200 thereby providing a circuit from the power source 170 to a relay 202 and an operating light 204.

The switch 196 utilizes five of the alternate positions for selectively isolating each of the wheel circuits one at a time and the sixth position is an off postion for the switch while the switch 194 is in an on position. A volt meter and amp meter unit 206 is provided between the power source 170 and the switch 196 such that a circuit can be established through each of the wheel circuits for testing purposes.

In operation it is thus seen that with the switches 194 and 196 in the positions shown in FIG. 8, a circuit is established from the battery 170 through the volt meter 206, the switch 196 to the air pressure signalling indicator light 12 and the electrical conductors in the front wheel as seen in FIG. 1 to the air pressure sensing unit 18. The 220 ohm resistor 190 provides an alternate circuit to ground 192. Accordingly, the volt meter 206 will measure the current flowing through this circuit to ground at 192 and if a reading is present it will be proof that the circuit is operating to the air pressure sensing unit 18. The size of the resistor 190 is such that a small amount of current flows which is insufficient to activate the signalling light 12 but sufficient to give a reading on the volt meter 206. By operation of the switches 194 and 196 each of the remaining wheel circuits may be tested in a similar manner. After each of the circuits have been tested and positive results have been obtained, the switches 194 and 196 are turned to close the switch 198 wherein the arms of the switches 194 and 196 extend upwardly. The volt meter 206 is now cut out of the monitoring system circuits as it is no longer needed. The operating light 204 is lit and the relay 202 is operated to place the battery in a circuit with the signalling lights 12, 14 and 16 and the respective air pressure sensing units 18. Operation of the air pressure sensing units 18 will cause the signalling lights to be actuated and appropriate corrective action may be taken to correct the underinflation problem in the tire indicated. It is seen that the air pressure monitoring system's circuitry can be tested at anytime by merely turning the switches 194 and 196 to the wheel circuit desired to be tested.

It is further understood that the test circuit of this invention is suitable for use in testing any circuit wherein the sensing unit is remotely located from the signalling indicator.

I claim:

1. A circuit for testing a monitoring circuit comprising,
   a power source in a monitoring circuit with a first signalling means and a sensing means whereby upon said sensing means being actuated siad first signalling means is activated by the closing of said monitoring circuit, and said sensing means being remotely located relative to said signalling means, and
   a second signaling means in said monitoring circuit and a resistance means being included closely adjacent said sensing means in parallel therewith and closing a test circuit through said resistance means such that said second signalling means is actuated, said resistance being sufficient to prevent the current in said monitoring circuit from activating said first signalling means while the current requirements of said second signalling means are small enough that it is actuated.

2. The structure of claim 1 wherein said second signalling means is an amp meter.

3. The structure of claim 1 wherein said sensing means is a normally open switch.

4. The structure of claim 1 wherein said sensing means is an air pressure indicator on the wheel of a vehicle and in communication with the interior of a tire on said wheel.

5. A test circuit for a vehicle tire air pressure monitoring system comprising,
   a vehicle having front and rear wheels and tires,
   an air pressure sensing unit on at least one said wheel rotatable therewith and in communication with the interior of said tire,
   an air pressure signalling indicator in a first circuit located remotely with respect to said air pressure sensing unit and a power source whereby upon said sensing unit being activated by a change in the tire air pressure said signalling indicator is activated by the closing of said first circuit, and a signalling means in said first circuit and a resistance means included closely adjacent said sensing means in parallel therewith and closing a second circuit such that said signalling means is actuated, said resistance being sufficient to maintain the current low enough in said first circuit from activating said signalling indicator while the current requirements of said signalling means are small enough that it is actuated.

6. The structure of claim 5 wherein said wheel is a front wheel on a hub rotatable on a stationary front axle, and said first circuit including an outer end portion of said axle being exposed outwardly of said wheel hub, an enclosure cover carried on said hub and extending over said outer end portion, an insulated electrical contact axially positioned in said outer end of said axle and an electrically conductive spring positioned in said cover and frictionally and yieldably engaging said contact, said spring being operatively connected to said sensing unit.

7. The structure of claim 5 wherein said wheel is a rear wheel and said first circuit including a rotatable rear axle having a housing, said wheel and tire mounted on said axle and adapted to turn therewith, an electrically conductive ring on said axle rotatable therewith and insulated therefrom by insulation means, a stationary brush operatively on said housing frictionally and yieldably engaging the exterior of said ring, said ring being operatively connected to said signalling unit.

8. The structure of claim 5 wherein separate first and second circuits are provided for each of said wheels and a switch is provided for selectively isolating each of said first and second circuits and for sharing a common signalling means.

* * * * *